United States Patent
Kauppert et al.

(10) Patent No.: US 8,787,838 B2
(45) Date of Patent: Jul. 22, 2014

(54) METHOD FOR SITE APPRAISAL FOR THE OPERATION OF A DATA RADIO RECEIVER, PARTICULARLY FOR THE CAPTURE OF CONSUMPTION DATA

(75) Inventors: Thomas Kauppert, Nuremberg (DE); Klaus Gottschalk, Winkelhaid (DE); Thomas Uhlmann, Muhr am See (DE)

(73) Assignee: Diehl Metering Systems GmbH, Nuerberg (DE)

( * ) Notice: Subject to any disclaimer, the term of this patent is extended or adjusted under 35 U.S.C. 154(b) by 260 days.

(21) Appl. No.: 13/156,815

(22) Filed: Jun. 9, 2011

(65) Prior Publication Data
US 2011/0306307 A1    Dec. 15, 2011

(30) Foreign Application Priority Data

Jun. 11, 2010  (DE) .......... 10 2010 023 448
Jun. 24, 2010  (DE) .......... 10 2010 024 887

(51) Int. Cl.
*H04B 17/00* (2006.01)

(52) U.S. Cl.
USPC ....... 455/67.13; 455/446; 455/447; 455/63.1; 455/464; 455/67.11; 455/134; 455/154.2; 370/342; 375/152; 365/185.22; 365/189.05

(58) Field of Classification Search
USPC .......... 455/67.13, 446, 447, 63.1, 464, 67.11, 455/134, 154.2; 370/342; 375/152; 365/189.05, 185.22
See application file for complete search history.

(56) References Cited

U.S. PATENT DOCUMENTS 6,226,271 B1    5/2001  Dent
7,133,686 B2 *  11/2006 Hundal et al. ................ 455/465

(Continued)

FOREIGN PATENT DOCUMENTS

DE    692 26 958 T2   3/1999
DE    698 02 826 T2   6/2002

(Continued)

OTHER PUBLICATIONS

LTE "3rd Generation Partnership Project; Technical Specification Group Core Network and Terminals; Handover procedures (Relase 8)" 3GPP TS 23.009 (2009) vol. 8.2.0, pp. 1-11, 25.

(Continued)

*Primary Examiner* — Marceau Milord
(74) *Attorney, Agent, or Firm* — Scully, Scott, Murphy & Presser, P.C.

(57) ABSTRACT

The suitability of a fixed or current mobile operating location for the receiver (19) in a data memory (13, 15) for picking up the consumption data (12) transmitted by a data radio channel in a wireless local data capture system (11) from consumption points (14) to a data memory (13, 15) can easily and reliably be qualitatively assessed in situ or for the purpose of remote diagnosis by virtue of a channel scan being initiated and the memory receiver (17) performing an RSSI measurement, which is preferably presented as a histogram (20) against current channel use. This renders permanent sources of interference and link budget problems in the data radio (particularly UHF) channel and also temporary sources of interference and collision problems in this channel identifiable and thereby avoids costly receiver location changes, without use of radio-specific specialist personnel, after a site has previously been selected for the receiver installation only empirically but inexpediently.

10 Claims, 2 Drawing Sheets

(56) References Cited

U.S. PATENT DOCUMENTS

Figure 1:
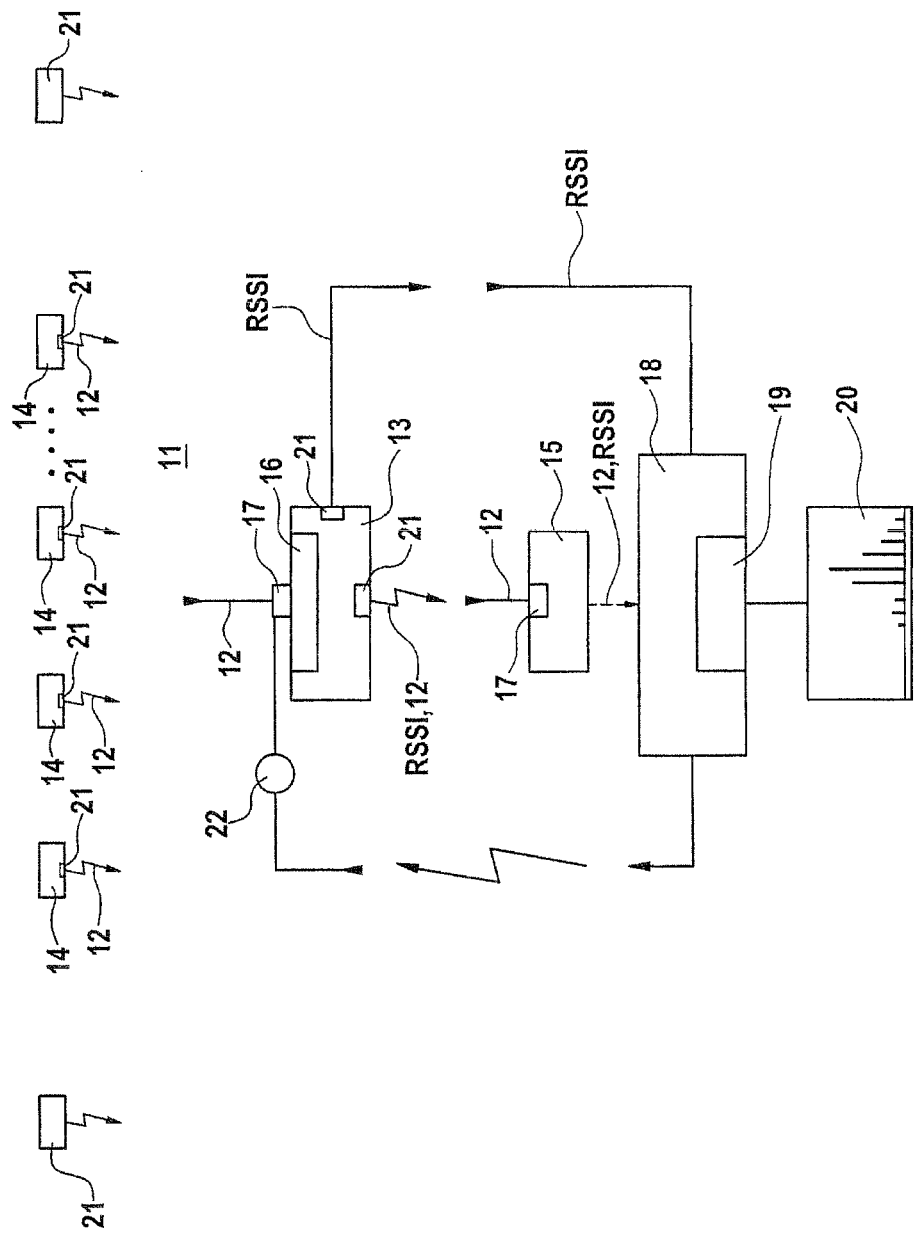

| | | | |
|---|---|---|---|
| 7,254,191 B2 * | 8/2007 | Sugar et al. | 375/340 |
| 7,269,151 B2 * | 9/2007 | Diener et al. | 370/329 |
| 7,408,907 B2 * | 8/2008 | Diener | 370/338 |
| 7,424,268 B2 * | 9/2008 | Diener et al. | 455/62 |
| 8,175,539 B2 * | 5/2012 | Diener et al. | 455/69 |
| 8,289,902 B2 * | 10/2012 | Fein et al. | 370/328 |
| 8,306,003 B2 * | 11/2012 | Ramesh et al. | 370/338 |
| 2002/0042269 A1 | 4/2002 | Cotanis | |
| 2003/0228846 A1 | 12/2003 | Berliner et al. | |
| 2004/0028123 A1 * | 2/2004 | Sugar et al. | 375/224 |
| 2004/0063403 A1 | 4/2004 | Durrant | |
| 2004/0132410 A1 | 7/2004 | Hundal et al. | |
| 2006/0013172 A1 * | 1/2006 | Ruuska et al. | 370/338 |
| 2006/0030270 A1 | 2/2006 | Cheng | |
| 2009/0046625 A1 * | 2/2009 | Diener et al. | 370/319 |

FOREIGN PATENT DOCUMENTS

| | | |
|---|---|---|
| DE | 103 58 650 A1 | 7/2004 |
| DE | 10 2006 003 333 A1 | 8/2007 |
| DE | 2009041835 A1 | 3/2011 |
| EP | 1953720 A1 | 8/2008 |
| EP | 2 192 706 A2 | 6/2010 |
| WO | WO 02/15417 A2 | 2/2002 |
| WO | 2010014872 A1 | 2/2010 |

OTHER PUBLICATIONS

Abstract of International Publication No. WO 9302515 A1, dated Feb. 4, 1993.

Abstract of European Patent Publication No. EP 1811271A, dated Jul. 25, 2007.

* cited by examiner

METHOD FOR SITE APPRAISAL FOR THE OPERATION OF A DATA RADIO RECEIVER, PARTICULARLY FOR THE CAPTURE OF CONSUMPTION DATA

The invention relates to a method according to the preamble of the main claim.

By way of example, DE 10 2006 003 333 A1 describes contemporary radio remote reading of consumption data. Accordingly, the respective consumption is captured by means of a measuring appliance installed at the consumption point—for example for the withdrawal of fresh water from a riser or for the emission of heat from a radiator—and is transmitted to the receiver in a fixed or mobile data memory, together with an individual consumption point, address and a time stamp, by short haul data radio via a wireless local area network (WLAN). In a fixed data memory, the respective currently accumulated consumption value overwrites the consumption value stored at the associated address to date. The data memory with its receiver is installed for this purpose in the basement antechamber of a housing complex, for example. Furthermore, the data memory has a transmitter in order to transmit the current data inventory upon request in walking past or in driving past to a query data memory for the consumption billing, to be performed separately offline. Alternatively, provision may be made for the receiver in the query data memory to be used to contact the consumption points directly if the accumulated consumption values are not buffer-stored in a central data memory in the housing complex, for example, but rather are stored at the individual consumption points themselves.

A general problem, particularly also in multi-story housing complexes, is the nonsecure radio links from the individual consumption points to the receiver in the fixed data memory or in the mobile query data memory, because in practice the data transmission is frequently impaired, for example by permanent or temporary sources of interference, by collisions with other radio transmissions or by too low a signal range (link budget) owing to the antennas and environment.

In light of these circumstances, the present invention is based on the technical problem of providing an easily implementable operating location appraisal for reliable data transmission to a data memory and, as far as possible at the same time, of introducing an opportunity to check the quality of the submitted data transmission which is not very involved.

The invention achieves this object by means of the essential features specified in the main claim. Accordingly, a channel in the frequency range which is intended to be used for the data transmission (particularly in the UHF spectrum) is scanned using a receiver over respective short time periods in discrete time and frequency steps; and the respective received signals are evaluated in relation to power using a statistical method, preferably converted in a manner which is known as such to produce a histogram presentation by means of a classified distribution of frequentness for the relative reception field strength (RSSI), which directly represents the use of the channel and hence the suitability of said channel for the intended data transmission. When such a scan result is usable, the data memory can be operated at this point, otherwise such a channel scan is repeated after taking appropriate adjustment measures or by scanning from another location.

If the evaluation of the RSSI measured values by means of the statistical method reveals that measured values are present significantly above the background noise, such adjustment measures may be the reduction of the reception range (e.g. by dispensing with a preamplifier in the receiver), restriction of the reception radius (e.g. by using a reception antenna with a directional characteristic) and/or the reduction in the frequentness of transmission (e.g. by virtue of shorter radio messages and/or longer intervals between the transmission times for the radio messages).

If the evaluation of the RSSI measured values reveals that there is a significant frequentness of reception at high reception field strength, transient or even permanent interference levels and hence, consistently, link budget problems can be expected. By contrast, the installation of the frequency filter which provides appropriately strong attenuation for the interference signal without significantly influencing the useful signal, and/or the selection of a different installation location (e.g. outside the directional transmission beam from a GSM directional transmission antenna), is/are advisable as adjustment measures.

For such querying of the channel use, it is possible to use a separately carried test receiver. Preferably, however, the receiver in the data memory itself is equipped with a manual or external opportunity for initializing and evaluating the channel scan for the initial installation and possibly for sporadic later quality checks, with ascertainment and presentation of the histogram, for example, on a laptop connected in situ or in a central control unit for the operational monitoring in the WLAN data capture system.

Advantageously, an operating location for the data memory operated at a fixed location, which operating location can still be used for the data transmission, can be checked at any time later by means of radio initiation of the channel scan for a remote diagnosis, for example from the central control unit, in order to dispatch a service associate to alter the installation location or to take appropriate adjustment measures if the local reception circumstances worsen. In the event of complaints on account of ascertained or possible malfunctions, a rapid channel check can thus take place by virtue of the remote diagnosis.

Such a channel scan ascertains permanent sources of interference which are detrimental to reliable data transmission, in particular, and link-budget (transmission-quality) problems in the currently used transmission channel, and also any further pending problems such as temporary sources of interference and collision situations on account of currently too many active transmitters in this channel or radio messages sent/received.

Whether upon initial installation or during later quality checks, the statistical method (e.g. using histogram presentation) always quickly provides information about the quality of the reception circumstances and hence about the suitability of the receiver site. The suitability of the latter can therefore also be appraised by an installer who is not specifically trained for WLAN operation, which avoids time-consuming and costly improper installations of data memories operated at fixed locations.

Additional developments and alternatives to the solution according to the invention can be found in further claims and, also in terms of the advantages thereof, from the following description of a preferred implementation example for practical application of the invention which is outlined in the drawing in a block diagram summary. In the drawing, FIG. 1 shows the data transmission together with the opportunity of a remote diagnosis regarding the current suitability of an operating site for a data memory particularly for buffer-storing consumption data, FIG. 2 shows a histogram—obtained for the operating location of the receiver in the data memory—for the RSSI distribution of frequentness over the relative power level (dBm) for the case of a heavily used data transmission channel, FIG. 3 shows such a histogram for the case of a channel with interference, and FIG. 4 shows such a histogram for the case of a data transmission channel which is free, that is to say suitable, at the current operating location of the data memory.

The wireless local area network of the outlined data capture system 11 is designed particularly for buffer-storing billable consumption data 12 (in the form of radio messages) in a data memory 13 operated at a fixed location. The consumption data 12 from a plurality of consumption points 14 are transmitted to said data memory by radio using a prescribed transmission channel, for example on the UHF band. The data memory for its part transmits the accumulated consumption data 12 by radio to a mobile evaluation data memory 15, which is occasionally moved past this point, for the purpose of transfer to a central control unit 18 which is set up for consumption billing.

The data memory 13 is equipped with a continuously wobbling scan controller 16 for scanning the transmission channel with an interval step size preferably in a range between 5 ms and 1280 ms over a variable reception period of typically between 1 s and 16383 s. Over the respective period, the receiver 17 in the data memory 13 takes RSSI measurements in the currently prescribed scan interval. These are statistically evaluated in relation to power, in particular are supplied to a histogram evaluation device 19, in situ (for example using a laptop, not shown) or in the central control unit 18 operated elsewhere. At any rate, it is actually possible to receive practically all occurring digital radio messages from a reception period of just approximately 60 seconds for a scan interval of approximately 5 milliseconds, which allows the collision statement of interest on the basis of the resulting RSSI histogram 20, for example as shown in FIG. 2 to FIG. 4.

Figure 2:
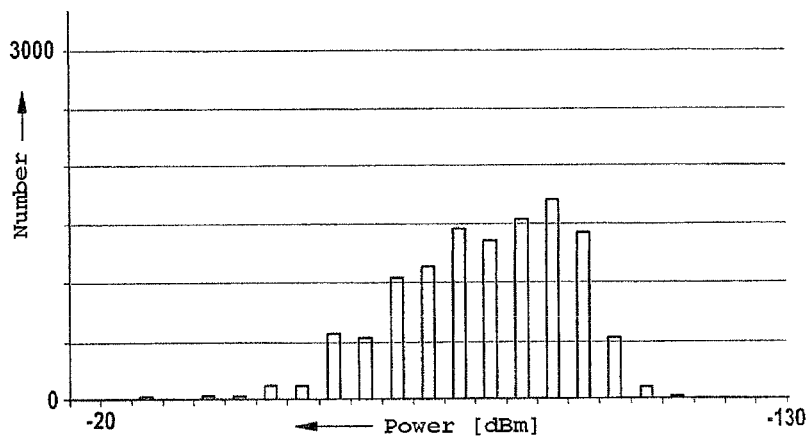
Figure 3:
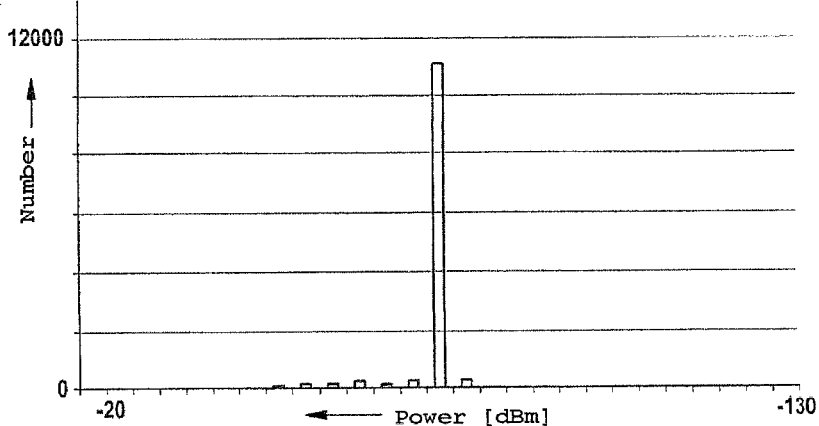
Figure 4:
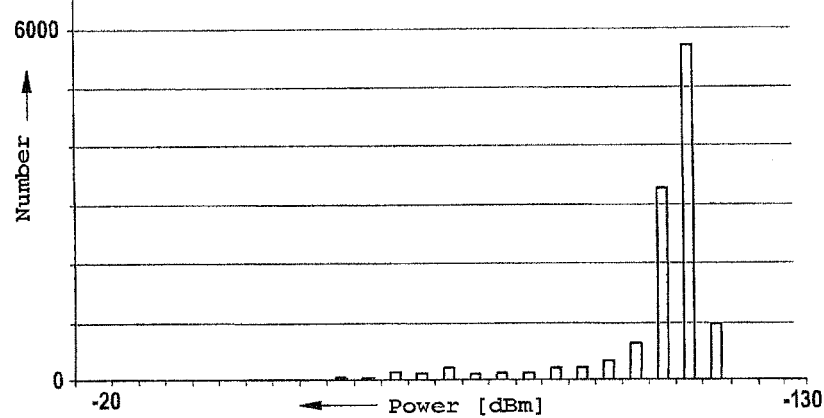

Realistic examples of such histograms 20 for various channel scans with intervals of 5 milliseconds over a scan period of 60 seconds (that is to say with 12 000 measured values) are shown in FIG. 2 to FIG. 4.

A channel which is currently in heavy use by active transmitters 21 produces the histogram 20 shown in FIG. 2, which accordingly provides the expectation of collision problems for radio messages during the data transmission to the fixed data memory 13 or to the mobile data memory 15. Elimination of such collision problems (when the site is maintained) is possible as a result of a reduction in the reception range (e.g. by dispensing with a preamplifier in a receiver) or a restriction in the reception radius (e.g. by means of a directional antenna). If it is also possible to influence other transmitters (radio sources), there is also the option of lowering the risk of collision by reducing the frequentness of transmission, i.e. lengthening the intervals between the transmission times for the radio messages, or by shortening the radio messages.

The histogram 20 shows in FIG. 3 refers to a source of heavy interference in the transmission channel, the high interference level of which reduces the sensitivity or efficiency (performance) of the data memory receiver 17. This link-budget problem can be rectified by choosing a different installation location particularly for the reception antenna (e.g. outside the directional transmission beam from a GSM directional antenna) or else by installing a suitable filter (if the transmission frequency of the source of interference is not in the transmission channel of the data capture system 11).

In a local position, which provides a histogram 20 with an RSSI distribution as shown in FIG. 4, with relatively low reception field strengths (corresponding to innocuous noise), the receiver 17 can be operated in a promising fashion and therefore a fixed data memory 13 can be installed or a mobile data memory 15 can be used at that location (or with the adjustment measures which have already been taken) without this also requiring further adjustment measures, because in this case only few and, in particular, quite predominantly weak received signals from transmitters 21 occupy the transmission channel under consideration.

Such an opportunity of appraisal is initiated in situ, that is to say directly on the data memory 13 or 15, for example by means of a manually operable switch 22 and is made possible by means of a laptop (as an evaluation device 19), for example, for representing the histograms 20. As considered in the block diagram, it is particularly also possible to initiate such a channel scan from time to time—even in normal operation—from the central control unit 18 and to present the resulting histogram 20 therein in order to prompt a change in location for the receiver 17 particularly in the data memory 13 installed at a fixed location or to initiate further adjustment measures, if required.

As an alternative or in addition to the presentation of the statistical collection by means of a histogram 20, the static evaluation of the measured frequentness (RSSI values) can also be performed fully automatically in the fixed data memory 13, in the mobile data memory and/or in the central control unit 18, and the result can be disclosed to the user in a suitable manner (by means of a light indicator or text display—not shown).

The method described allows not only the site of a fixed data memory 13 but also the reception quality of a mobile data memory 15 operated as a reader to be appraised in order to find appropriate adjustment measures for solving any data transmission problems which occur.

The suitability of a fixed or current mobile operating location for the receiver 17 in a data memory 13, 15 for picking up consumption data 12 transmitted via a data transmission channel in a wireless local data capture system 11 from consumption points 14 to a data memory 13, 15 can thus easily and reliably be qualitatively assessed, in accordance with the invention, in situ or by means of remote diagnosis by virtue of a channel scan being initiated and the memory receiver 17 performing an RSSI measurement which is statistically evaluated in relation to power and presented as a histogram 20 relating to the current channel use, for example. This renders permanent sources of interferences and link-budget problems and also temporary interference problems and other collision problems in this channel identifiable and thereby avoids costly changes of a receiver location, without requiring the use of radio-specific specialist personnel for this purpose, after site selection for the receiver installation which is possibly only empirical but inexpedient previously.

LIST OF REFERENCE SYMBOLS

11 Data capture system v (with 15)
12 Consumption data (from 14)
13 Fixed data memory (for 12 from 14)
14 Consumption point (provides 12)
15 Mobile data memory (for 12 from 13 or from 14)
16 Channel scan controller (to obtain 20)
17 Receiver (for 12 at 13 or at 15)
18 Central control unit (with 19)
19 Evaluation device (for presenting 20 as per 16)
20 Histogram (from 19)
21 Transmitter (for 12 at 13 or 14)
22 Switch (manual or initiated by 18 to obtain 20 by means of 16)

The invention claimed is:

1. A method for site appraisal for fixed or mobile operation of a data radio receiver in a data memory by means of test reception for capturing consumption data, the method comprising:
    making a qualitative assessment of the current operating site of the receiver on the basis of a channel scan, for which qualitative assessment, a certain scan step size is used over a certain time period to capture RSSI measured values which are evaluated in relation to power using a statistical method, and
    wherein the RSSI measured values are presented as a histogram.

2. The method according to claim 1, wherein a receiver site is sought in which the histogram shows an RSSI distribution with exclusively or at least predominantly low reception field strengths.

3. The method according to claim 1, wherein, the channel scan for the statistical method is effected over a period of between one second and 16838 seconds.

4. The method according to claim 3, wherein the period is in the order of magnitude of 60 seconds for an interval in the order of magnitude of 5 milliseconds.

5. The method according to claim 1, wherein, the channel scan is effected with intervals of between 5 and 1280 milliseconds' step size.

6. The method according to claim 1, wherein, if the evaluation by means of the statistical method results in frequentness of reception significantly above the background noise level, appropriate adjustment measures to avoid expected collision problems are taken, preferably a reception range is reduced, the reception radius is restricted and/or the frequentness of transmission is reduced.

7. The method according to claim 1, wherein, if the evaluation by means of the statistical method results in a frequentness of reception at high reception field strength, appropriate adjustment measures to avoid expected interference levels and/or link budget problems are taken, preferably a different installation location for the reception antenna is chosen and/or a filter which provides strong attenuation for the interference signal and only weak attenuation for the useful signal, in particular, is installed.

8. The method according to claim 1, wherein, the channel scan is repeated at various reception locations or after appropriate adjustment measures have been taken until a situation is achieved in which the RSSI power distribution in the histogram means that significantly active transmitters are received only in low power ranges.

9. The method according to claim 1, wherein, the channel scan is initiated in situ on a receiver of a data memory or is initiated by a central control unit for remote diagnosis.

10. A method for site appraisal for fixed or mobile operation of a data radio receiver in a data memory by means of test reception for capturing consumption data, the method comprising:
    making a qualitative assessment of the current operating site of the receiver on the basis of a channel scan, for which qualitative assessment, a certain scan step size is used over a certain time period to capture RSSI measured values which are evaluated in relation to power using a statistical method, and
    wherein the statistical method used for the evaluation of the measured RSSI values is an analysis of the distribution of frequentness for the measured RSSI values.

\* \* \* \* \*